June 27, 1961 E. M. CREAMER, JR 2,990,448

ELECTRICAL SYSTEM

Filed Feb. 5, 1959

INVENTOR.
EDGAR M. CREAMER, JR.
BY
Alfred Stapler
AGENT 2,990,448
ELECTRICAL SYSTEM Edgar M. Creamer, Jr., Melrose Park, Pa., assignor to Philco Corporation, Philadelphia, Pa., a corporation of Pennsylvania Filed Feb. 5, 1959, Ser. No. 791,432
5 Claims. (Cl. 178—5.4)

Figure 1:
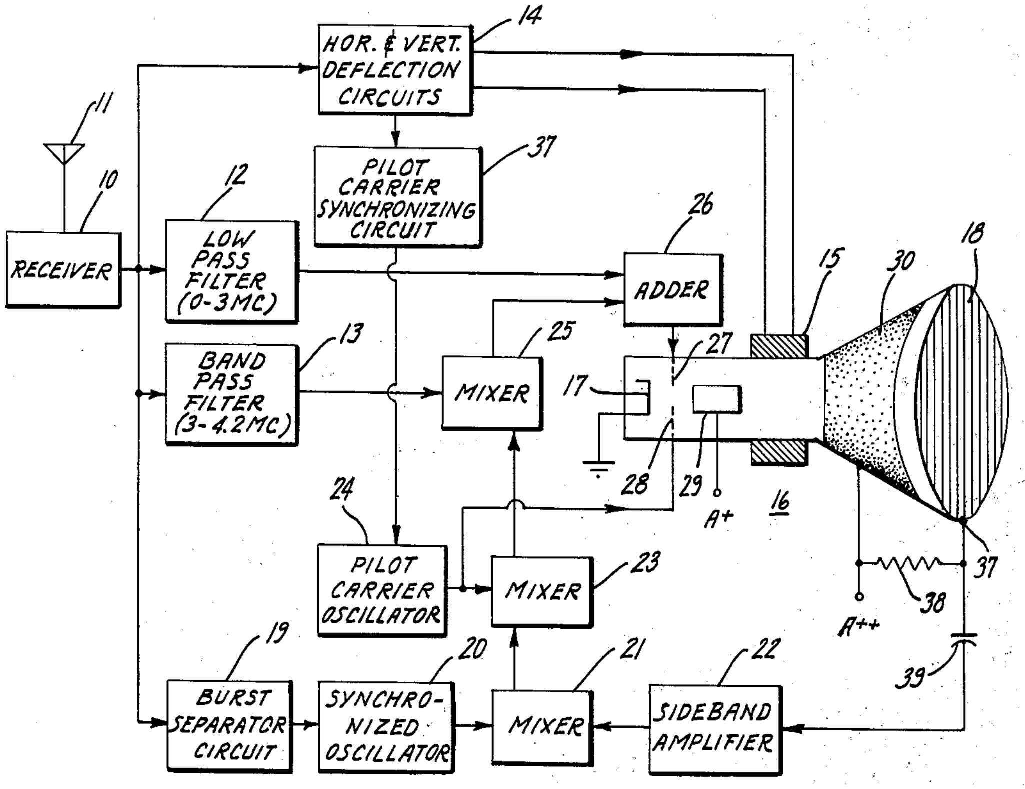

The invention relates to improvements in cathode ray tube systems and, more particularly, to the reduction of visible interference patterns in the images reproduced by the color cathode ray tubes of certain types of color television receivers.

It is known to provide the screens of cathode ray tubes with so-called "indexing" elements and to control the relationship between the scanning of the screen by the beam and the application of video intelligence to the cathode ray tube by means of electrical indications (called the indexing signal) produced by these elements as the beam scans the screen.

Such tubes have been used in color television receivers, for example, where they were provided with screen structures comprised of a multiplicity of minute phosphor elements, different ones of which emit light of different primary colors (e.g. red, green and blue) in response to electron impingement. It is known to incorporate indexing elements in such screen structures and to utilize the indexing signal produced as the beam scans the screen structure to control the relationship between the color representative beam intensity control signal and the impingement of the beam on the various color phosphor elements so as to achieve maximum fidelity of color reproduction.

In such receivers it has been found that the indexing signal may be subject to contamination by the video signal. If that happens the indexing signal sometimes becomes unable to exert the desired control upon the relation between color information and beam impingement on color phosphor elements with the result that the color fidelity may suffer. This problem has been overcome by modulating either the aforementioned electron beam itself, or an auxiliary beam impinging upon the screen near the first mentioned beam, with an auxiliary signal which is not subject to control by color information. This auxiliary signal, sometimes referred to as the "pilot carrier" signal, is produced with independently determined amplitude and at a frequency which is substantially higher than that of the highest frequency component of the color representative video signal. The reasons why the use of this pilot carrier signal reduces contamination of the indexing signal by the video signal are fully described in a number of publications including, for example, Creamer et al. Patent No. 2,667,534, issued January 26, 1954, Partin Patent No. 2,743,531, issued April 17, 1956 and an article which begins on page 1108 of the September, 1956 issue of the Proceedings of the I.R.E. Briefly, however, the use of this high frequency pilot carrier signal permits the derivation, from the cathode ray tube screen structure, of an indexing signal in the form of modulation sidebands of a carrier wave at the elevated pilot carrier frequency. Conventional frequency selective devices of comparatively simple construction suffice to separate these high frequency modulation components from the undesired contaminating signals which are generated at the comparatively low frequencies of the video signal.

In receivers using such a pilot carrier signal there sometimes appeared on the screen structure of the cathode ray tube visible interference patterns which had a tendency to move erratically across the screen structure, in a manner considered objectionable by many observers.

Accordingly it is a primary object of the invention to provide a color television receiver system of the type hereinbefore described in which visible interference is rendered substantially less objectionable.

It is another object of the invention to provide a color television receiver system of the type hereinbefore described in which moving interference patterns are substantially eliminated.

To achieve the foregoing objects, as well as others which will appear, I equip color television receivers of the type under consideration, i.e. of the type which utilizes a pilot carrier signal to modulate beam intensity, with apparatus which establishes fixed relationships between the frequency of the pilot carrier signal and the frequencies of those other periodically recurrent signals which control the scanning of the beam. When this is done, any visible interference patterns caused by the use of the pilot carrier signal are rendered stationary on the screen and this, in turn, renders them subtsantially less objectionable to most observers.

While the establishment of any fixed relationship between the frequencies of the pilot carrier signal and the scanning signals produces some degree of reduction in the objectionable character of the visible interference patterns, a particularly significant improvement is achieved by establishing the pilot carrier at a frequency which is equal to an odd integral multiple of one-half the horizontal line scanning frequency. This is so because the existence of this particular relationship not only renders the interference patterns stationary, but also reduces their apparent intensity.

Figure 2:
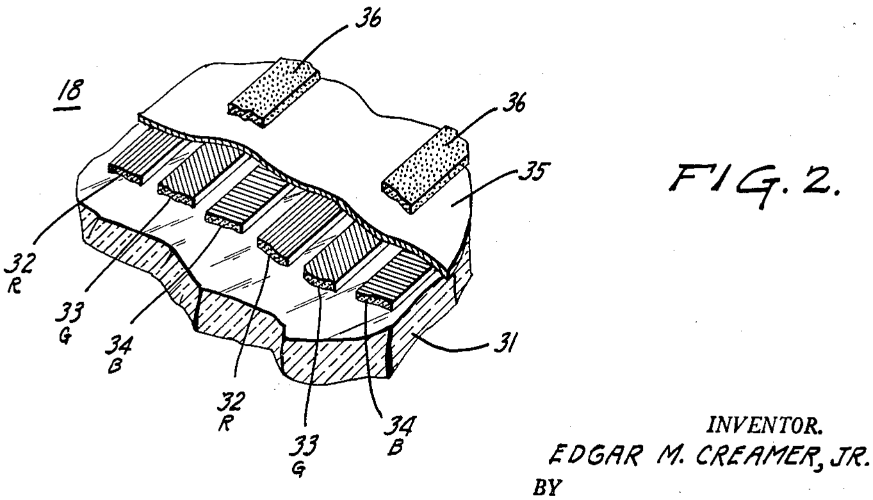

The manner in which embodiments of my invention are effective to accomplish the aforestated objects will be understood more clearly from a consideration of the description which follows, together with the accompanying drawing wherein:

FIGURE 1 illustrates, in block diagram form, a preferred embodiment of my invention; and FIGURE 2 is a detailed illustration of a fragment of the screen structure of the cathode ray tube shown in FIGURE 1.

The embodiment of my invention illustrated in FIG. 1, to which reference may now be had, comprises a receiver portion 10 supplied with a color television signal (of the form which is presently standard for this country) either from an antenna 11, or in any other way, e.g. by coaxial cable connection to a closed circuit transmitter. This receiver portion 10 may comprise the conventional radio frequency, converter, intermediate frequency and second detector stages found in any black-and-white or color television receiver, which cooperate in the usual manner to reproduce, at the output of the receiver portion 10, the received color television signal reduced to its lowest or video frequency range. In its present day standard form, this video signal comprises a component occupying principally the frequency range from zero to three megacycles and representative primarily of the brightness of the televised scene. In addition the video signal comprises a component occupying the 3 to 4.2 megacycle frequency range and representing the coloration of the televised scene. As is well known, this latter component takes the form of a subcarrier wave at a nominal frequency of approximately 3.58 megacycles, which is modulated in phase and amplitude in accordance with the saturation and hue of the televised scene, respectively. In addition this standard video signal comprises two components which determine the geometry of the reproduced image, these being the conventional horizontal and vertical synchronizing pulses recurring respectively 15,750 times per second and 60 times per second. Finally the video signal contains so-called color synchronizing bursts, each consisting of a few cycles of a sinewave of fixed amplitude and predetermined reference phase and at the nominal frequency of the color subcarrier wave, namely at approximately 3.58 megacycles. Each of these color synchronizing bursts is superposed on a so-called "backporch," this being the portion of each horizontal blanking pulse immediately following the occurrence of the horizontal synchronizing pulse. This video signal from receiver portion 10 is supplied to a low pass filter 12 which is constructed, in any one of numerous conventional ways, to pass only signals in approximately the zero to three megacycle frequency range to the substantial exclusion of signals at all other frequencies. The signal from receiver portion 10 is also supplied to a bandpass filter 13, which may also be of any one of numerous conventional forms, and which is constructed to transmit only signals in the 3 to 4.2 megacycle frequency range to the substantial exclusion of signals at all other frequencies. Accordingly, at the output of low pass filter 12 there will be present the brightness representative component of the received signal, but not its color representative component, while at the output of bandpass filter 13 there will be present the color representative component, but not the major portion of the brightness representative component.

The composite video signal from receiver portion 10 is also supplied to conventional horizontal and vertical deflection circuits 14 which respond to the horizontal and vertical synchronizing pulses comprised in the video signal in conventional manner to produce the usual horizontal and vertical deflection signals. These deflection signals are supplied to a conventional deflection yoke 15, associated with cathode ray tube 16 in the usual manner to cause the electrons traveling from the cathode 17 of tube 16 toward its screen 18 to scan a conventional raster on that screen.

Finally the composite video signal from receiver portion 10 is supplied to a burst separator circuit 19 which serves to separate the aforementioned color synchronizing bursts from all other portions of the composite video signal. This burst separator may also take any one of a number of conventional forms. For example it may consist of a vacuum tube having at least one control grid electrode and biased so as to remain non-conductive in the presence of all signal portions whose amplitude levels are below that of the horizontal blanking pulses. As a result only portions of the signal superposed upon these blanking pulses, namely the deflection synchronizing pulses and the color bursts, pass through this vacuum tube to its output circuit. In this output circuit there may be connected a sharply frequency selective filter consisting, for example, of a high Q resonant circuit tuned to the nominal frequency of the color subcarrier. This filter passes the color synchronizing bursts while rejecting the deflection synchronizing signals which occur at much lower frequencies. The output signal of burst separator circuit 19 thus consists solely of the color synchronizing bursts and is supplied to an oscillator 20, which may be of any conventional construction suitable for continuous operation at approximately the nominal subcarrier frequency. Application of the color synchronizing bursts to this oscillator serves to lock the same accurately in frequency and phase with the color synchronizing bursts.

The output signal from oscillator 20 is supplied to one input of a mixer 21, to a second input of which there is supplied the output signal from sideband amplifier 22. The character of this latter output signal will be discussed in detail hereinafter. Mixer 21 may be of any conventional form operative to heterodyne the two input signals applied thereto and to provide, at its output, that heterodyne component whose nominal frequency equals the sum of the nominal frequencies of the two input signals. This heterodyne component is then supplied to one input of a second mixer 23, to whose second input there is supplied the output signal from pilot carrier oscillator 24. This latter oscillator is preferably a sinewave oscillator, of any conventional construction, productive of a continuous output signal at some frequency substantially higher than the highest frequency present in the received composite video signal. The detailed considerations governing the selection of the specific pilot carrier oscillator frequency will be discussed in detail hereinafter. Mixer 23, which may also be of any conventional construction, operates to heterodyne the two input signals supplied thereto and to produce, at its output, a heterodyne component at a nominal frequency equal to the difference between the nominal frequencies of the input signals. This output signal from mixer 23 is supplied to one input of a third mixer 25, to whose second input there is supplied the color representative output signal from bandpass filter 13. Mixer 25, which may again be of any conventional construction, responds to its two input signals to produce at its output a heterodyne component thereof at a nominal frequency equal to the difference between the nominal frequencies of the input signals. This output signal from mixer 25 is supplied to one input circuit of adder 26, to whose second input circuit there is supplied the brightness representative output signal from low pass filter 12. Adder 26, which may be of any conventional form suitable for the additive combination of the input signals applied to its input terminals, operates to combine additively the brightness representative signal from low pass filter 12 and the output signal from mixer 25 which, as will be shown hereinafter, carries the color representative information of the received composite video signal, modified in accordance with the indexing signal derived from the cathode ray tube 16 so as to coordinate the occurrence of intervals during which it represents the intensities of the various colors with the intervals during which the cathode ray tube beam scans portions of screen structure 18 which emit light of corresponding colors. This output signal from adder 26 is therefore suitable for controlling the intensity of the electron beam which scans this screen structure and is accordingly applied to control grid electrode 27 of the cathode ray tube. This electrode controls the intensity of one of the two electron beams produced within this cathode ray tube. The intensity of the second electron beam produced within cathode ray tube 16 is under the control of beam intensity control grid 28, which is supplied with the output signal of pilot carrier oscillator 24. Both of these electron beams are formed of electrons emitted from cathode 17, focused by first anode 29, which is supplied with the usual first anode potential from a conventional source of such anode potential A+, and accelerated by second anode 30, which may take the usual form of a conductive coating on the inside of the funnel-shaped portion of the cathode ray tube, and which is supplied with suitable second anode potential from a conventional source of such second anode potential A++. Both of these electron beams, which are preferably oriented so as to impinge at very closely spaced points upon the screen structure 18, are subjected to substantially the same deflection under the influence of deflection yoke 15. Details of one form of apparatus for generating and controlling two such electron beams within a cathode ray tube are described and illustrated in Fite and Rittman Patent No. 2,712,087, issued June 28, 1955.

The screen structure 18 of cathode ray tube 16, shown in detail in the fragmentary view of FIG. 2, to which reference may now be had, comprises a large number of groups of generally parallel phosphor strips disposed side by side upon the interior surface of tube faceplate 31. Each of these groups of phosphor strips comprises three different strips, respectively designated by reference numerals 32, 33 and 34 in FIG. 2, the strips designated 32 being made of a phosphor material responsive to electron impingement to emit light of one primary color, e.g. red, the strips designated 33 being made of a material emissive of another primary color, e.g. green, and the strips 34 being made of a material emissive of a third primary color, such as blue. These phosphor strips are disposed across the screen structure in regularly recurrent sequence and in such numbers and geometrical arrangement that the scanning electron beams, during any horizontal line scan, encounter a red phosphor stripe 32, a green phosphor stripe 33 and a blue phosphor stripe 34, in rapidly recurrent succession. The number of such phosphor strips is so chosen in relation to the horizontal line scanning velocity that the electron beam traverses successive phosphor strips emissive of light of the same color at a rate which is preferably not lower than the nominal frequency of the received color subcarrier, and which may be substantially higher. For example, it has been found advantageous to provide a sufficient number of color phosphor strips so that the scanning beam traverses these at a 7.2 megacycle rate, during each horizontal line scan, this being approximately twice the normal frequency of the received subcarrier. Disposed over all of the phosphor strips is a layer 35 of a conductive material, such as aluminum, sufficiently thin to permit penetration of an electron beam projected upon this layer to the phosphor strips beneath it. This layer 35 serves the twofold purpose of intensifying (by reflection) the light emitted from the screen structure toward the exterior of the tube and of providing a layer of substantially uniform secondary electron emissivity. Disposed on this conductive layer 35 is a plurality of indexing strips 36 which are arranged in some known geometrical relationship to the phosphor strips, e.g. with one indexing strip aligned with each green light emissive phosphor strip 33. These indexing strips may be made of a material having a secondary electron emissivity, in response to impingement by an electron beam, which is substantially different from that of the conducting layer 35. If the latter is made of aluminum, then a suitable material for the indexing strips 36 is magnesium oxide, which has much higher secondary electron emissivity than aluminum. The conducting layer 35 is further coupled (conductively, capacitively, or otherwise) to a terminal 37, external of the cathode ray tube 16 in FIG. 1. This terminal 37, in turn, is connected through load resistor 38 to the second anode 30 and through capacitor 39 to the input of sideband amplifier 22. Variations in secondary electron emission from the screen structure then produce corresponding variations in the current through resistor 38 and these variations are supplied to the input of sideband amplifier 22 through capacitor 39. Such variations in secondary emission take place both because the scanning electron beams alternately traverse magnesium oxide strips 36 and exposed portions of the aluminum film which lie between these strips and because the intensities of these beams are subject to variations in accordance with the control signals applied to grids 27 an 28.

Assuming the screen structure 18 of the cathode ray tube 16 to be so constructed that the electron beam traverses successive green light emissive phosphor strips—and therefore also successive indexing strips 36—at a rate which is approximately equal to twice the nominal frequency of the received color subcarrier, i.e. at about a 7.2 megacycle rate, the secondary emission from the screen structure will also vary in intensity at this same rate. Since the intensity of one of the scanning electron beams, namely that whose intensity is subject to control by electrode 28 of tube 16, also varies at the much higher rate determined by the frequency of pilot carrier oscillator 24, the intensity of the secondary electron emission from the screen structure will also vary at this much higher pilot carrier frequency. Moreover the variations in secondary emission produced in response to these two different influences will intermodulate and the current variations in resistor 38 will therefore include components corresponding to the modulation sidebands of a signal at the pilot carrier frequency modulated by a signal at the frequency of beam traversal of successive indexing strips 36. One of these modulation sidebands, e.g. the upper, is selected and amplified by sideband amplifier 22. To this end sideband amplifier 22 may comprise conventional frequency selective circuits and a sufficient number of conventional amplification stages. Obviously the sideband component selected and amplified by sideband amplifier 22 is subject to variations in frequency and phase which are indicative of variations in the rate of beam traversal of screen indexing elements 36 and which are therefore also indicative of variations in the intervals during which the electron beam traverses the various colored light emissive phosphor strips of the screen structure. These variations are preserved throughout the several hetehodyning operations to which this signal is subjected. In mixer 25 there are further superposed, on this signal, the phase and amplitude variations representative of received color information which are present in that input signal to mixer 25 which is supplied thereto from bandpass filter 13. Consequently, as has been previously pointed out, the output signal from mixer 25 contains the color representative variations of the received video signal and also the variations corresponding to variations in the intervals during which the beam traverses the various color phosphor strips. Moreover it may be shown that the frequency transformations effected by the several successive mixing operations are such that the output signal from mixer 25 has a frequency equal to the rate at which the electron beam traverses successive groups of color phosphor strips of the screen structure.

To the extent to which the system of FIGURE 1 has been described so far it is entirely conventional, being fully described in the aforementioned patents and publication.

I have now further discovered that, in the various nonlinear devices through which the indexing signal passes in such a receiver, there may be produced undesired signals, usually at frequencies which are harmonics of the frequency at which the electron beams scan the indexing strips. These undesired signals further intermodulate with the desired sideband component derived from sideband amplifier 22 and produce, at the output of mixer 25, undesired components in the same frequency range as the desired heterodyne output components of mixer 25. These undesired components are applied to the beam intensity control electrode 27 and produce visible variations in the intensity of light emitted from various portions of the screen structure. If, as has been the case prior to my invention, the frequency of the pilot carrier signal is not fixed with respect to the frequencies of the deflection signals, it will drift with respect to these frequencies and so will the frequency of the undesired components produced by intermodulation of the desired screen-derived sidebands and the aforementioned undesired harmonics of the index strip scanning rate. In consequence the aforementioned undesired variations in light intensity will occur at different points in the scanning raster during different scans thereof, with the result that the interference patterns formed by these undesired variations will appear to move across the screen. In the type of color television receiver under consideration these moving interference patterns are particularly objectionable because they manifest themselves not only as changes in intensity, but also as changes in coloration, which are generally even more noticeable than intensity changes. It is these interference patterns which are rendered stationary and/or reduced in intensity, in accordance with my invention, by establishing the frequency of the pilot carrier signal in a fixed relationship to each of those components of the received composite video signal which determine the geometry of the reproduced image.

To this end I equip the system of FIGURE 1 with a pilot carrier synchronizing circuit 37 which responds to the horizontal and/or vertical synchronizing components of the received signal, or to auxiliary signals derived from either or both of these received signals, to establish the frequency of the pilot carrier oscillator in a fixed relationship to these synchronizing components. This apparatus may be of any one of a number of conventional forms. Thus if the pilot carrier oscillator is adjusted to operate, in the absence of any synchronizing influence, at a frequency which is approximately equal to an integral multiple of the horizontal line scanning frequency, or to an integral multiple of one-half the horizontal line scanning frequency, then direct injection of a pulse signal, derived from the received horizontal synchronizing pulses and occurring at the same frequency as the latter, into the tank circuit of the oscillator will produce the desired synchronization of the oscillator frequency with the horizontal synchronizing pulse frequency.

Alternatively more or less elaborate frequency multiplying circuits, of individually conventional forms, may be interposed between the deflection circuits 14 and the pilot carrier oscillator 24, these circuits being responsive to the horizontal or vertical synchronizing pulses to produce a signal at a multiple of their frequencies which is equal to the desired frequency of the pilot carrier oscillator 24; this latter signal may then be injected into the tank circuit of the pilot carrier oscillator for synchronization of the frequency of the latter.

Still another alternative is to compare the phase of the high frequency signal derived by frequency multiplication from the scanning synchronizing signals with the output signal from the pilot carrier oscillator 24 (e.g. in a conventional phase detector) and to utilize variations in the phase detector output signal, which denote departures from synchronism between the two phase compared signals, to control the frequency of the oscillator in any conventional manner, e.g. through the operation of a conventional type of reactance tube. Finally it is also possible to dispense with the pilot carrier oscillator altogether and to use, as a pilot carrier signal, a signal derived by frequency multiplication from the horizontal or vertical synchronizing signals. In view of the wide variety of synchronizing devices which are available for my purpose and in view of the conventional character of each one of these devices, they have not been illustrated in detail in the drawing.

As has been pointed out, the establishment of any fixed frequency relationship between the pilot carrier oscillator signal and the image geometry determining signals will render the visible interference patterns stationary on the screen of the cathode ray tube. This is so because the frequency of the pilot carrier oscillator then no longer drifts with respect to the scanning frequencies and the undesired heterodyne components developed in the heterodyning operation to which the indexing signal is subject will have the same time-phase position with respect to the line scannings of the beams across the screen structure during successive scans of any particular line. Consequently any variations in light intensity caused by these undesired signals will occur in the same location during successive scans of the raster and the resultant visible interference pattern will be stationary. This is particularly advantageous in the type of color television receiver under consideration because it eliminates the color changes associated with interference patterns which are not stationary. Moreover if the frequency relationship between the pilot carrier signal and the deflection synchronizing pulses is selected in such a manner that the frequency of the pilot carrier signal is equal to an odd multiple of one-half the horizontal line scanning frequency, the interfering signals will have opposite phases during successive raster scans and those points at which the light emission is intensified by the interfering signal during one raster scan will coincide with those points at which the light emission is diminished during the next succeeding raster scan. Since these variations in opposite senses occur at a rate which the human eye is unable to follow, their visual effects on an observer will tend to cancel and the apparent intensity of the interference pattern will therefore be greatly diminished.

While I have described only one embodiment of my invention, it will be understood that it is applicable to any one of a number of specific forms of color television receiver systems, provided they are of the basic type hereinbefore described, that is of the type using an indexing screen structure and a pilot carrier signal. For example, my invention is applicable irrespective of the specific mechanism used to generate the indexing signal. Thus, while I have shown a screen structure in which differences in secondary eletron emission between different portions of the structure are relied upon to provide the indexing signal, differences in light emission (either in intensity or wavelength) may also be relied upon for this purpose, as may differences in conductivity and in other parameters. Similarly, while I have described my invention with reference to a cathode ray tube having two electron beams, of which one is modulated with the video signal and the other is modulated with the pilot carrier signal, it will be understood that a single beam, subjected to modulation with both of these signals, may also be used. Another variable is the order in which the various heterodyning operations involving the indexing signal are carried out. These and still other variations will occur readily to those skilled in the art without departing from my inventive concept. Accordingly I desire the scope of this concept to be limited only by the appended claims.

I claim:

1. In a color television display system comprising: a cathode ray tube having a screen structure comprising phosphors emissive of light of different colors and indexing elements and having a source of an electron beam, means for deflecting said beam to scan a raster on said screen, means for producing an indexing signal in response to the scanning of said indexing elements by said beam, means for modulating the intensity of said beam by video signals to produce a color picture on said screen, means for modulating the intensity of said beam by a pilot carrier signal to cause said indexing signal to be substantially free from the effects of said video modulation, and means for utilizing said indexing signal to control the relationship between said video modulation and said scanning, variations in said pilot carrier signal in relation to said scanning tending to produce interference patterns of varying coloration in said color picture; the improvement which comprises means for establishing a fixed frequency relation between said pilot carrier signal and said scanning whereby said variations in coloration of said interference patterns are reduced.

2. In a color television display system comprising: a cathode ray tube having a screen structure comprising phosphors emissive of light of different colors and indexing elements and having a source of an electron beam, means responsive to periodic deflection control signals for reflecting said beam to scan a raster on said screen, means for producing an indexing signal in response to the scanning of said indexing elements by said beam, means for modulating the intensity of said beam by video signals to produce a color picture on said screen, means for modulating the intensity of said beam by a pilot carrier signal at a frequency substantially higher than the highest frequency of said video signals thereby to cause said indexing signal to be substantially free from the effects of said video modulation, and means for utilizing said indexing signal to control the relationship between said video modulation and said scanning, variations in said pilot carrier signal in relation to said scanning tending to produce interference patterns in said color picture; the improvement which comprises means for establishing a fixed frequency relation between said pilot carrier signal and said deflection control signals whereby said interference patterns are reduced.

3. The system of claim 2 further characterized in that said means for establishing said fixed frequency relation comprises means for cohering said pilot carrier signal with one of said deflection control signals.

4. The combination of claim 3 further characterized in that said means for cohering said pilot carrier and deflection control signals is effective to establish the pilot carrier signal at a frequency which is an odd multiple of one-half the frequency of said one of said deflection control signals.

5. The combination of claim 2 further characterized in that said means for modulating the intensity of said beam by a pilot carrier signal comprises an oscillator productive of said pilot carrier signal and means for applying the output of said oscillator to said beam to control the intensity thereof, and in that said means for establishing said fixed frequency relation comprises means for synchronizing the frequency of said oscillator with a harmonic of one of said deflection control signals.

References Cited in the file of this patent

UNITED STATES PATENTS

| | | |
|---|---|---|
| 2,667,534 | Creamer et al. | Jan. 26, 1954 |
| 2,877,295 | Loughlin | Mar. 10, 1959 |